US011340843B2

(12) United States Patent
Scheele et al.

(10) Patent No.: US 11,340,843 B2
(45) Date of Patent: May 24, 2022

(54) SYSTEM AND METHOD FOR STORING INTERRELATED IMAGE INFORMATION IN A PRINT JOB FILE

(71) Applicant: Esko-Graphics Imaging GmbH, Itzehoe (DE)

(72) Inventors: Joachim Scheele, Oldendorf (DE); Nils Kay, Oldendorf (DE)

(73) Assignee: Esko-Graphics Imaging GmbH, Itzehoe (DE)

( * ) Notice: Subject to any disclaimer, the term of this patent is extended or adjusted under 35 U.S.C. 154(b) by 0 days.

(21) Appl. No.: 15/734,009

(22) PCT Filed: May 13, 2020

(86) PCT No.: PCT/EP2020/063264
§ 371 (c)(1),
(2) Date: Dec. 1, 2020

(87) PCT Pub. No.: WO2020/234068
PCT Pub. Date: Nov. 26, 2020

(65) Prior Publication Data
US 2022/0075571 A1  Mar. 10, 2022

Related U.S. Application Data

(60) Provisional application No. 62/849,218, filed on May 17, 2019.

(51) Int. Cl.
*G06F 3/12* (2006.01)
*H04N 1/32* (2006.01)
(52) U.S. Cl.
CPC ............ *G06F 3/1208* (2013.01); *G06F 3/128* (2013.01); *G06F 3/1247* (2013.01); *H04N 1/32106* (2013.01)

(58) Field of Classification Search
CPC ...... G06F 3/1208; G06F 3/1247; G06F 3/128; H04N 1/32106
See application file for complete search history.

(56) References Cited

U.S. PATENT DOCUMENTS 5,715,331 A   2/1998  Hollinger
5,850,789 A  12/1998  Rudolf et al.
(Continued)

FOREIGN PATENT DOCUMENTS

CN   102652321 A   8/2012
EP     1031916 A2   8/2000
(Continued)

OTHER PUBLICATIONS

Chinese Office Action for Chinese Application No. 202080003784.7, dated Dec. 30, 2021, with translation, 14 pages.
(Continued)

*Primary Examiner* — Moustapha Diaby
(74) *Attorney, Agent, or Firm* — RatnerPrestia

(57) ABSTRACT

A method and system for creating a printing plate from a vector format image file having image and non-image areas. A boundary in vector coordinates is identified via a user interface that defines each image area corresponding to an image patch. The image file is raster image processed (RIPped) to create RIPped image information associated with the vector coordinates corresponding to the image patches. The RIPped image information and associated vector coordinates are processed to create RIPped image patches, register marks attached to each RIPped image patch, and the RIPped image patches with register marks and corresponding vector coordinates stored in a processing file. The system includes a computer memory, an interface for providing the image file, a user interface, and a computer processor configured to perform the method.

22 Claims, 4 Drawing Sheets

(56) References Cited

U.S. PATENT DOCUMENTS

| | | | |
|---|---|---|---|
| 6,396,593 | B1 | 5/2002 | Laverty et al. |
| 6,411,396 | B1 | 6/2002 | Benson et al. |
| 6,823,793 | B2 | 11/2004 | Dewitte |
| 6,954,291 | B2 | 10/2005 | Klein et al. |
| 6,976,798 | B2 | 12/2005 | Keane et al. |
| 7,182,007 | B2 | 2/2007 | Berge et al. |
| 8,009,330 | B2 | 8/2011 | Dardikman et al. |
| 8,477,380 | B2 | 7/2013 | Telem et al. |
| 9,375,916 | B2 | 6/2016 | Thomas et al. |
| 9,663,261 | B2 | 5/2017 | Azad et al. |
| 10,828,917 | B2 | 11/2020 | Scheele et al. |
| 2003/0048467 | A1* | 3/2003 | Okamoto .............. H04N 1/2038 358/1.12 |
| 2003/0053138 | A1* | 3/2003 | Klein ................... H04N 1/3872 358/3.29 |
| 2004/0179213 | A1 | 9/2004 | Oba |
| 2005/0105113 | A1* | 5/2005 | Manki ...................... H04N 1/58 358/1.9 |
| 2011/0229026 | A1* | 9/2011 | Tsunematsu .......... G06V 10/457 382/165 |
| 2012/0242693 | A1* | 9/2012 | Hamada .................... G06T 1/00 345/629 |
| 2015/0346922 | A1 | 12/2015 | Robertson |
| 2016/0210088 | A1 | 7/2016 | Van Den Branden |
| 2017/0024845 | A1* | 1/2017 | Filler ..................... G06T 1/005 |
| 2018/0253263 | A1 | 9/2018 | Hower et al. |
| 2019/0016081 | A1 | 1/2019 | Widner et al. |
| 2019/0061338 | A1 | 2/2019 | Scheele et al. |

FOREIGN PATENT DOCUMENTS

| | | |
|---|---|---|
| EP | 1292120 A2 | 3/2003 |
| WO | 2018/015500 A1 | 1/2018 |
| WO | 2019/038400 A1 | 2/2019 |

OTHER PUBLICATIONS

International Search Report and Written Opinion for International Application No. PCT/EP2020/063264, dated Aug. 5, 2020, 12 pages.

Novakovic et al., "A Model for Improving the Flexographic Printing Plate Making Progress", Technical Gazette, 17, 4 (2010), pp. 403-410.

PlatePatcher 18.0 User Manual, dated May 18, 2018, 52 pages.

Enterprise Workflow Brochure, Hybrid Software, Oct. 10, 2017, 4 pages.

Entire patent prosecution history of U.S. Appl. No. 16/319,108, filed Jan. 18, 2019, entitled, "System and Process for Mounting a Printing Plate on a Carrier," now U.S. Pat. No. 10,828,917, issued Nov. 10, 2020.

Entire patent prosecution history of U.S. Appl. No. 16/111,863, filed Aug. 24, 2018, entitled, "Printing Plate Segment Mounting System and Method."

Entire patent prosecution history of U.S. Appl. No. 16/952,709, filed Nov. 19, 2020, entitled, "Printing Plate Segment Mounting System and Method."

* cited by examiner

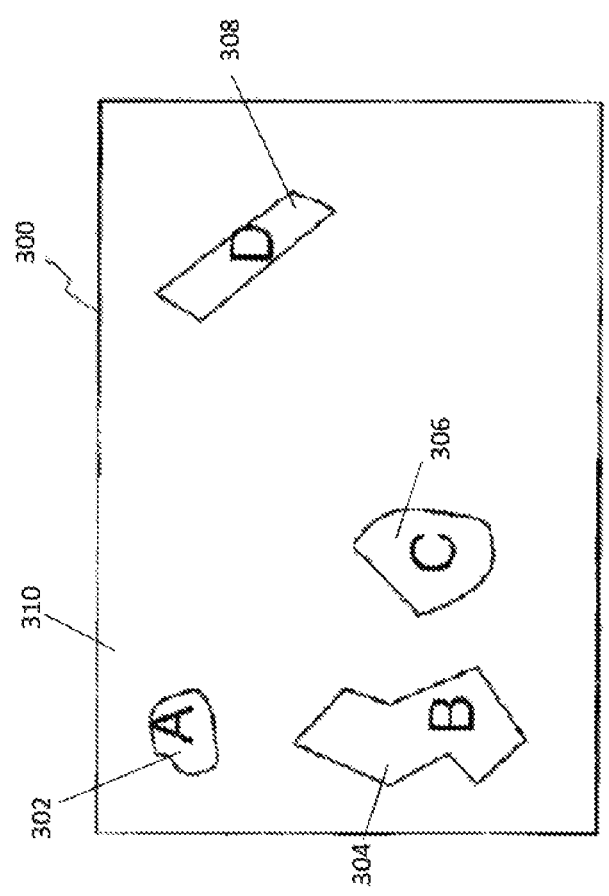
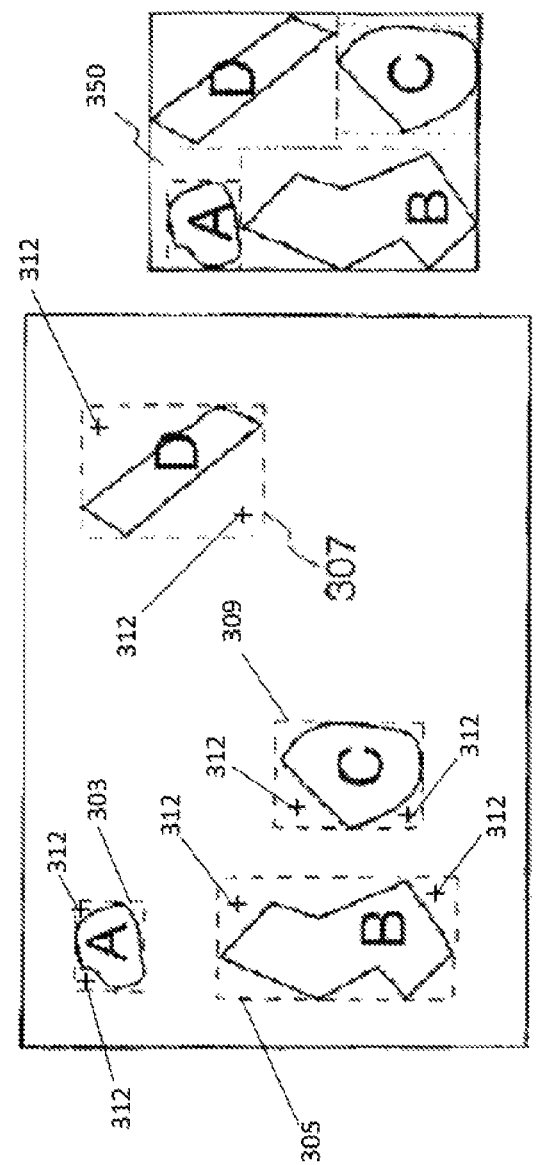
FIG. 3A
FIG. 3B
FIG. 3C

SYSTEM AND METHOD FOR STORING INTERRELATED IMAGE INFORMATION IN A PRINT JOB FILE

CROSS-REFERENCE TO RELATED APPLICATIONS

This patent application is a U.S. National Phase Patent Application of PCT Application No. PCT/EP2020/063264, filed May 13, 2020, which claims priority from U.S. Provisional Application Ser. No. 62/849,218, filed May 17, 2019, titled SYSTEM AND METHOD FOR STORING INTERRELATED IMAGE INFORMATION IN A PRINT JOB FILE, incorporated herein by reference in its entirety.

BACKGROUND OF THE INVENTION

Large sheets of corrugated cardboard, such as for use in large folded boxes (e.g. for TV-sets, appliances, etc.), may typically carry printed images on only small areas of the boxes, with most of the cardboard surface being non-image area. Because polymer flexo printing plates for corrugated printing have a relatively large thickness (3-7 mm), a lot of polymer material would have to be removed during plate processing, were a plate the size of the full area of each printed box to be used. To reduce waste of polymer and overall costs, it is known to isolate patches that contain image information from empty space and put them in close proximity together (sometimes also with patches from other print jobs) on the polymer plate during imaging, exposure, and processing. After plate processing, the patches are separated and mounted (e.g. with double-sided adhesive tape) onto a carrying substrate in the precise position require for printing the desired layout on the box. To facilitate alignment, the patches are equipped with register marks.

The foregoing process is generally described in U.S. Pat. No. 6,954,291 ("the '291 Patent"), titled "METHOD, APPARATUS, AND COMPUTER PROGRAM FOR REDUCING PLATE MATERIAL WASTE IN FLEXOGRAPHY PLATE MAKING," granted to the owner of the present invention, and embodied in Esko PlatePatcher software as described in the User's Manual for PlatePatcher 18.0, both of which are incorporated herein by reference in their entireties.

As described in the '291 Patent, identification of the patches and adding register marks may be performed on bitmap images generated by the raster image processor (RIP), such as by using the PlatePatcher module of Esko's Digital Flexo Suite for Corrugated, sold by Esko Software BVBA of Ghent, Belgium. The PlatePatcher module allows a user to analyze image positions in the original print job based on bitmap formats (like TIFF OR LEN) to create a desired number of patches to be later mounted on a carrier sheet. The process of analyzing bitmap format information can be very time consuming. Use of pixel-based formats generates huge amounts of data, consuming both time and resources, due to high image resolution.

As is known to those of skill in the art, a LEN file is a proprietary encoded bitmap file used by Esko Software BVBA in its process workflow. Likewise, a TIFF file is a type of bitmap format. Bitmap files traditionally store only binary information identifying whether individuals pixels in the file representing the smallest increment of resolution are "on" or "off." Esko's LEN files have the capacity to store additional information in a different "layer" of the file.

Alternatively, it is known to analyse an input file in vector formats to create a plurality of smaller PDF files as the output to create plate patches. The file sizes, time and resources required for processing are less than for bitmap formats, but spurious pixels—known as "dirt"—that do not belong in the image may remain. Exemplary dirt may include bumps and dots on the bitmap output, which usually arise during scanning the images or during image processing. Vector-input to vector-output processes (such as PDF to PDF) tend to preserve the presence of such dirt in vector format, when it would be more desirable to isolate and remove such dirt.

Thus, there is a need in the art to eliminate or mitigate the above-identified problems.

SUMMARY OF THE INVENTION

One aspect of the invention includes a method for creating a printing plate. The method comprises providing an image file in vector format comprising one or more image areas and one or more non-image areas and receiving via a user interface, an identification of a boundary in vector coordinates defining each image area, each image area with its identified boundary corresponding to an image patch. The image file is raster image processed (RIPped) into a pixel-based format to create RIPped image information. The RIPped image information is associated with the vector coordinates corresponding to the image patches. Vector coordinates for the one or more image patches may optionally be used for identifying the non-image areas of the image file and removing spurious data from the non-image areas prior to performing the raster image processing step. The RIPped image information and associated vector coordinates corresponding to the image patches are used as an input for processing the RIPped image information to automatically create one or more RIPped image patches. One or more register marks are attached to each RIPped image patch, the one or more RIPped image patches with register marks and the corresponding vector coordinates for each image patch are stored in a processing file for creating printing plate. Mounting device information received via the user interface may be associated with the RIPped image information and vector coordinates corresponding to the image patches, and saved to the processing file. Determining positions for the one or more registration marks for each of the image patches may occur prior to creating the RIPped image information or after creation of the image patches.

In one embodiment, bitmap information corresponding to the RIPped image information may be stored in a first layer of a template file with the vector coordinates for each image patch stored in a second layer of the template file. In another embodiment, bitmap information corresponding to the RIPped image information is stored in a first file and the vector coordinates for each image patch are stored in a second file associated with the first file.

In some embodiments, the foregoing steps may be performed for each of a first image file and a second image file, resulting in the creation of one or more first image file image patches and one or more second image file image patches. The step of creating the processing file in this embodiment comprises creating at least one processing file having at least one first image file image patch and at least one second image file image patch.

Another aspect of the invention comprises a computer program product comprising non-transitory machine readable instructions embodied in computer readable tangible medium for instructing a computer processor to perform any of the method steps discussed above.

The method as described above may further comprise creating a printing plate from the processing file, physically separating the printing plate into one or more plate patches corresponding to the one or more RIPped image patches, affixing the one or more plate patches on a printing substrate using mounting device information and register marks in the processing file to coordinate placement of each plate patch on the substrate, and printing an image using the printing substrate having the plate patches affixed thereto.

In some embodiments, the steps for creating patches may be performed for each of a first image file and a second image file, in which case separating the printing plate comprises separating at least one first image file plate patch and at least one second image file plate patch, creating a first substrate comprising the at least one first image file plate patch and a second substrate comprising the at least one second image file plate patch, and printing first and second images using the first and second printing substrates, respectively.

Another aspect of the invention is a system for creating a printing plate. The system comprises a computer memory, a computer processor coupled to the memory, an interface coupled to the processor to provide an image file in vector format comprising one or more image areas and one or more non-image areas, and a user interface coupled to the memory and the processor. The processor is configured to receive, via the user interface, an identification of a boundary in vector-coordinates defining each image area, each image area and identified boundary corresponding to an image patch. The processor is further configured to raster image process the image file into a pixel-based format to create RIPped image information and associate the RIPped image information with the vector-coordinates corresponding to each image patch. The processor is programmed to use the RIPped image information and associated vector coordinates corresponding to the image patches as an input to process the RIPped image information to automatically create one or more RIPped image patches. The processor is also configured to attach one or more register marks to each RIPped image patch, and save the one or more RIPped image patches with register marks and the corresponding vector coordinates in a processing file for creating a printing plate.

The system may further comprise processing units for converting the processing file to a printing plate. Such a system may also comprise a cutting unit, in which case the processor is further configured to provide instructions to the cutter for cutting the printing plate into one or more physical plate patches corresponding to the one or more image patches. The system may also comprise a mounting device, in which case the processor is further configured to provide instructions for positioning a mounting device for affixing the one or more plate patches on a carrier substrate to coordinate placement of each plate patch on the substrate. The system may also comprise a printing unit configured to print an image using the printing substrate having the plate patches affixed thereto.

Yet another aspect of the invention is a method of reducing plate material in plate making. The method comprises the step of providing one or more original images, each original image including one or more full-format vector-based images, and identifying, using a user interface, at least two disjoint elements that contain image information. Each disjoint element comprises a patch, with each patch defined by boundary information in vector format. A screened bitmap-format image of the original image is created and stored in bitmap format in association with the patch boundary information in vector format. One or more patches are automatically created using the screened bitmap-format image and patch boundary information as an input, and one or more patches are packed to form a set of one or more packed images. Each packed image includes at least one patch, has an area, and is suitable to be sent to an imagesetter. The collective area of the packed images covers less plate area than the scanned full-format screened images. Other aspects of the invention include a computer program product comprising non-transitory machine readable instructions embodied in computer readable tangible medium for instructing a computer to perform the foregoing steps, and a system comprising a computer memory, a computer processor coupled to the memory, an interface coupled to the processor to provide an image file in vector format comprising one or more image areas and one or more non-image areas, and a user interface coupled to the memory and the processor, wherein the processor is programed to perform the foregoing method steps.

BRIEF DESCRIPTION OF THE DRAWINGS

FIG. 3A illustrates an example of image file including image areas and non-image areas.

FIG. 3B illustrates an example of boundaries defining the image areas in FIG. 3A.

FIG. 3C illustrates an example of a layout of a processing file including the image areas identified in FIG. 3B.

DETAILED DESCRIPTION OF THE INVENTION

Figure 1:
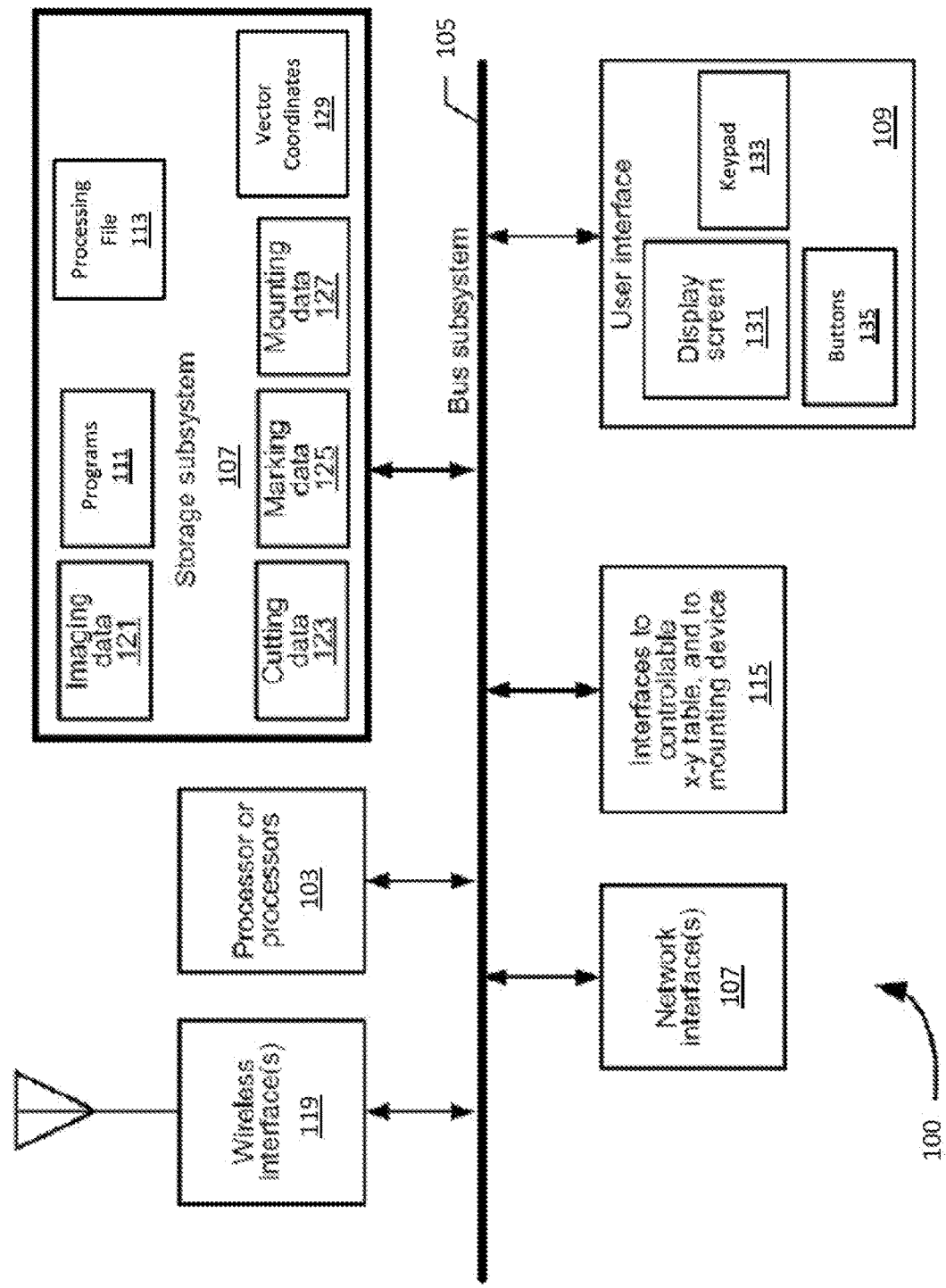
FIG. 1 is a schematic diagram of a system for creating a printing plate and printing an image according to an aspect of the present invention.
Figure 2:
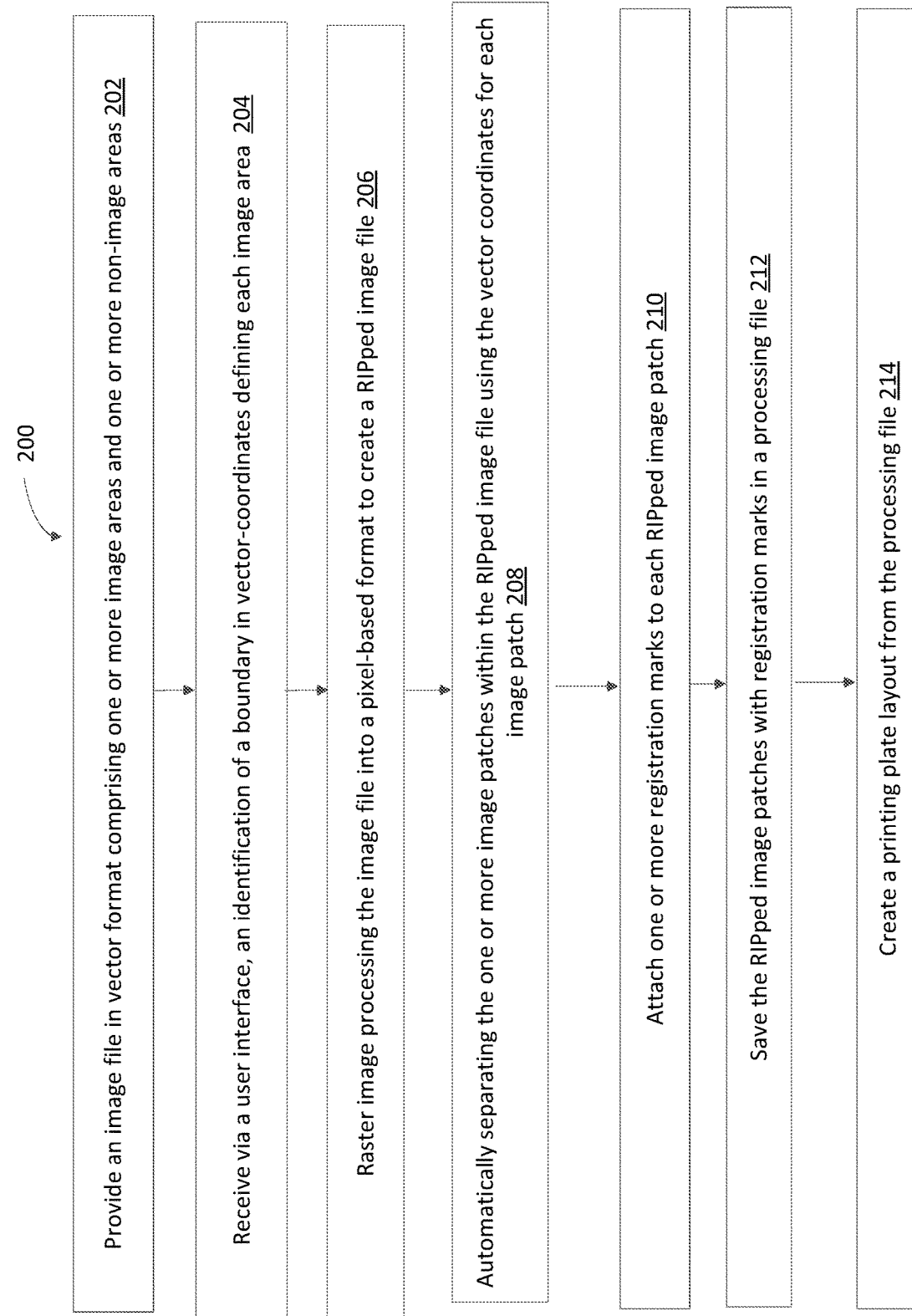
FIG. 2 shows a flowchart of an example method embodiment of creating the printing plate using the system of FIG. 1.

Referring now to the figures, FIG. 1 schematically illustrates an example of a processing system (system) 100 including components configured to create a printing plate. FIG. 2 shows a flowchart of an exemplary method embodiment of producing the plate using the components of FIG. 1.

As illustrated in FIG. 1 the system 100 includes one or more processors 103. Each processor 103 may include one or more of a CPU or similar element, a graphics processing unit (GPU), and/or a programmable digital signal processing (DSP) unit. The system 100 further includes a storage subsystem 107 with at least one storage medium, which may include memory embedded in a semiconductor device, or a separate memory subsystem including main RAM and/or static RAM, and/or ROM, and also cache memory. The storage subsystem may further include one or more other storage devices, such as magnetic and/or optical and/or further solid-state storage devices. A bus subsystem 105 may be included for communicating between the components. Although typically complex, the bus subsystem is shown in FIG. 1 as a single bus. The processing system further may be a distributed processing system with processors coupled by a network, e.g., via network interface 117 or wireless network interface 119.

The processing system includes a user interface 109 that in one embodiment includes a display screen 131, a keyboard 133, and a pointing device 150, such as a mouse, trackball, touchpad, touchscreen, joystick, or the like. In one embodiment, the user interface includes buttons 135, either in hardware form, or as so-called soft buttons that are displayed on the display screen for user interaction. The display screen may be, e.g., a liquid crystal display (LCD), organic light emitting display (OLED), a cathode ray tube (CRT) display, or the like. The term storage device, storage subsystem, or memory unit as used herein, if clear from the context and unless explicitly stated otherwise, also encompasses a storage system such as a disk drive unit.

The storage subsystem thus includes a tangible computer-readable medium that is configured with, e.g., encoded with instructions, e.g., logic, e.g., software programs 111 that when executed by one or more of the processors, causes carrying out one of more of the method steps described herein. The software may reside in the hard disk, or may also reside, completely or at least partially, within the RAM and/or within the processor during execution thereof by the computer system. Thus, the memory and the storage elements with the processor also constitute computer-readable medium on which are encoded instructions.

The processing system in some embodiments further includes one or more interfaces 115 to a plate maker, exposure unit, cutter, image maker, mounting device and a printing substrate, not shown. In one example, the storage subsystem includes instructions that when executed by a processor, provides image file, marking data, cutting data and mounting device data, all having a common frame of reference as described in detail below.

Thus, embodiments of the present invention comprise systems for identifying patches corresponding to image areas to be printed, creating a printing plate comprising a plurality of patches, separating the patches, mounting the patches on a carrier substrate, and printing an image using the patches on the carrier substrate, such as systems comprising the components depicted in FIG. 1 and described above. Another aspect of the invention comprises a process for making a printing plate. A flowchart corresponding to an exemplary process is depicted in FIG. 2.

Step 202 includes providing an image file in vector format including one or more image areas and one or more non-image areas. For example, the image file may be created in vector format using Adobe® Illustrator® software or other similar graphic design software. In one embodiment, an image file in a vector format is provided to the processor 103 via one of the user interface 109 or the network interface 117. The image file may include one or more image areas or one or more non-image areas or combination of one or more image and non-image areas. An example of an image file 300 in a vector format including image areas 302, 304, 306 and 308 and a non-image area 310 is illustrated in FIG. 3A.

Step 204 includes, receiving via a user interface, an identification of a boundary in vector-coordinates defining each image area such that each identified bounded image area correspond to an image patch. In one example, a user via the user interface 109 inputs the boundary identifications to the processor 103. In the example illustrated in FIG. 3B, each of the boundaries 303, 305, 307 and 309 in vector-coordinates defines each of the image areas 302, 304, 306 and 308, respectively, each of which corresponds to an image patch. The processor 103 receives, via the user interface 109, an identification of a boundary in vector-coordinates, which defines the one or more image areas. The identification of such boundaries may also be performed using Adobe® Illustrator® software or other similar graphic design software.

Step 206 includes raster image processing the image file, such as with processor 103, into a pixel-based format to create a RIPped image file. The pixel based information is stored in association with the vector coordinate data 129 identifying the image patches in storage subsystem 107. In one embodiment, the bitmap and vector date are stored together in a template file, such as a specialized bitmap file, such as a LEN file, having the bitmap information in one layer, and the vector coordinate data for the image patches in another layer. In another example, the bitmap information may be stored in any bitmap format (such as TIFF) in a first file with vector information corresponding to the patch boundaries stored in an accompanying, distinct file (such as a text file). Mounting device data 127 (e.g. output device identifiers and mounting orientation) may also be stored in the template file or in the separate file in association with the bitmap information.

In preferred embodiments, the processor 103 may also use the vector coordinates 129 defining the boundaries of the one or more image patches to identify the non-image areas (any areas not within patch boundaries, such as, e.g. 310 in FIG. 3A) of the image file. Spurious data may then be removed from the non-image areas prior to processing the image file.

At step 208, the one or more image patches within the RIPped image file are automatically separated, such as with processor 103, using mounting device information/data 127 and the vector coordinates 129 for each image patch as provided to the processor.

Step 210 includes attaching one or more register marks to each RIPped image patch. In one embodiment, the positions of each register mark 312 for each image patch 302, 304, 306 and 308 are determined after the patch has been created, manually by a user reviewing the bitmap file, automatically by a processor, or a combination of automatic suggestions and manual confirmation or modifications. The positions of these marks are stored as marking data 125 in the storage subsystem 107. In another embodiment, the user defines the locations for the registration marks 312 at the same time the user defines the image patch boundaries (e.g. using Adobe® Illustrator® software or other similar graphic design software), and the registration mark data accompanies the image patch boundary information as information in the template file. The registration mark data may be in the same layer as the patch boundary information, or in a different layer in a LEN file, or may be in the same file or in a different standalone file associated with a traditional bitmap (e.g. TIFF) file.

Step 212 comprises saving, such as with processor 103, the RIPped image patches with their corresponding register marks 312 and the corresponding vector coordinates 129 in a processing (output) file 113 for further processing. The processing file 113 may comprise a single file including information in various layers, or multiple files associated with one another. As depicted in FIG. 3C, the processing file may include a layout 350 comprising a set of packed images in which all of the patches have been oriented differently and packed onto a plate area for efficiently creating a plate from which the patches can later be cut. The collective area of the packed images covers less plate area than the scanned full-format screened image from which the patches were isolated.

Patches from different jobs may be merged together on the same plate, with identifying information for each patch to allow the patch to be matched to the job, position, and orientation in subsequent steps. Step 214 comprises creating a printing plate from the processing file, using any process known in the art, such as by imaging the image on a mask, exposing the polymer to actinic radiation through the mask to cure the irradiated portions of the polymer, and washing the polymer to remove uncured polymer. The invention is not limited to any particular method for making a plate from the processing file, however.

Thus, by contrast to the workflow as discussed in the '291 Patent and as historically performed using PlatePatcher software, the system and method as claimed herein permits a user to define as part of the design process the outlines of the patches in vector coordinates, which vector coordinates accompany the bitmap file as a separate layer (e.g. in a LEN file) or as a separate file (e.g. a TIFF bitmap file plus a text file) as an input to a processor, such as a processor running PlatePatcher software. The processor running PlatePatcher software then uses the user pre-defined vector information to create the patches automatically from the bitmap file, rather than having to first create the bitmap file and then interact with an operator (including providing suggestions for patch boundaries to be confirmed by the operator) based on a review of the bitmap information. The remaining processing steps discussed from this point forward (after patches are created) may be performed in the same way as traditional PlatePatcher workflow.

Figure 4:
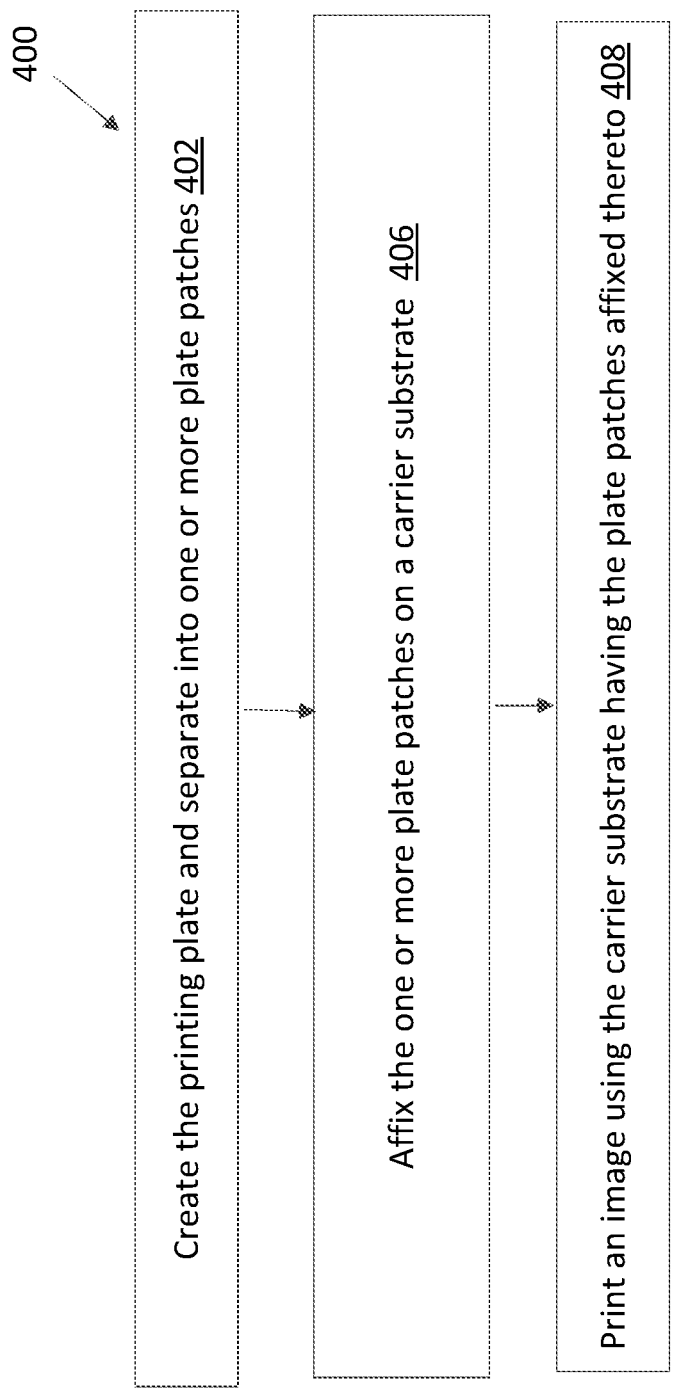
FIG. 4 is a flow chart for an exemplary method of printing an image using the system of FIG. 1.

FIG. 4 depicts a flowchart showing the additional steps for printing an image on the printed plate using the processing file described above.

Step 402 comprises separating the printing plate into one or more plate patches corresponding to the one or more image patches (e.g. patches 302, 304, 306 and 308). In one example, the printing plate is separated by cutting the printing plate into different plate patches using stored cutting data 123 corresponding to the patch boundaries. Step 404 comprises affixing the one or more plate patches on a carrier substrate using the mounting device information/data (e.g. 127) and register marks (e.g. 125) in the processing file (513) to coordinate placement of each plate patch on the substrate. Step 406 comprises printing an image using the carrier substrate having the plate patches affixed thereto.

In one embodiment, methods 200 and 400 described with respect to FIGS. 2 and 4 utilizing the system 100 can be performed for multiple image files. For example, multiple image files include a first image file and a second image file. The method for performing for each of the first image file and the second image file includes creating one or more first image file image patches for the first image file and creating one or more second image file image patches for the second image file. In one example, the step of creating the processing file includes creating at least one processing file having at least one first image file image patch with register marks and corresponding vector coordinates and at least one second image file image patch with register marks and corresponding vector coordinates. The method also includes separating the printing plate by separating at least one first image file plate patch corresponding to the first image file image patch and by separating at least one second image file plate patch corresponding to the second image file. The method also includes creating a first substrate including the at least one first image file plate patch and a second substrate including the at least one second image file plate patch. The method further includes printing a first image using the first printing substrate having the first image file plate path affixed thereto and printing a second image using the second printing substrate having the second image file plate patch affixed thereto.

Thus, aspects of the invention involve a combination of vector based and pixel based image analysis. In a first step, the images of an image file based on vector format are analysed, identified and dedicated to individual patches. Additional information for the mounting device are given as well (e.g. output device and mounting orientation). Also positions of register marks can be determined in this step. This process is controlled by the operator. The position of images and other information concerning the image are written into a template file. In a second step the vector based image file is cleaned up (to remove "dirt," as described above) and ripped into a bit based format. In a third step individual images in the ripped image file are separated according to the information in the template file and register marks are attached. In some embodiments, however, the step of assigning register mark locations may be performed at the same time as identifying the patch boundaries.

A customer (a user of the software as described herein) predefines the areas for the patches in, e.g. Adobe® Illustrator®, or other design software. This predefinition process uses a vector format. The user can decide at this stage which elements will be grouped into one patch and which elements should be ignored. Also the position of the register marks can be defined to put them into the design at this stage. This information is tagged to the bitmap (e.g. LEN) file and is used later by the ESKO PlatePatcher™ function in a fully automated way. Elements in the predefined areas may be grouped together such that waste is minimized. Register marks may be added automatically or in predefined areas. The output generated may be tailored in a format specific to the type of mounting device to be used. In a manual workflow the PlatePatcher software can arrange everything as suggested in the design for manual interaction and/or confirmation. However, predefinition of patch boundaries (and, optionally, registration marks) permits full automation of the PlatePatcher functionality, without a need for user interaction, if such an automated process is desired.

Predefinition of patches in vector format allows for a quick calculation of the plate material actually needed for the job prior to RIPping the file. In that way the cost for a print job can be calculated faster and more precisely in advance. By contrast, prior art systems required first converting the file to bitmap format before determining the boundaries of each patch, which was previously a time-consuming step. Storage of information for rearranging the patches in vector format is more conducive to full automation.

It should be noted that this application focuses on a manner in which patch boundary information is defined, stored, and used by a process, such as a processor running PlatePatcher software. To the extent other aspects of the PlatePatcher functionality are not detailed herein, in at least one embodiment, such aspects of the PlatePatcher process may be performed and stored in essentially the same manner as in the prior art.

Note that when a method is described that includes several steps, no ordering of such steps is implied, unless specifically stated.

It will also be understood that embodiments of the present invention are not limited to any particular implementation and that the invention may be implemented using any appropriate techniques for implementing the functionality described herein. Furthermore, embodiments are not limited to any particular operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill skilled in the art from this disclosure, in one or more embodiments.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting of only elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein device A is directly connected to device B. It means that there exists a path between the device A and the device B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

What is claimed:

1. A method for creating a printing plate:
   a) providing an image file in vector format comprising one or more image areas and one or more non-image areas;
   b) receiving via a user interface, an identification of a boundary in vector coordinates defining each image area, each image area with its identified boundary corresponding to an image patch;
   c) raster image processing the image file into a pixel-based format to create RIPped image information;
   d) associating the RIPped image information with the vector coordinates corresponding to the image patches;
   e) using the RIPped image information and associated vector coordinates corresponding to the image patches as an input, processing the RIPped image information to automatically create one or more RIPped image patches;
   f) attaching one or more register marks to each RIPped image patch; and
   g) saving the one or more RIPped image patches with register marks and the corresponding vector coordinates for each image patch in a processing file for creating a printing plate.

2. The method of claim 1, further comprising receiving mounting device information via the user interface in step (b), associating the mounting device information with the RIPped image information in step (d), and saving the mounting device information to the processing file in step (g).

3. The method of claim 1, wherein step (d) comprises storing bitmap information corresponding to the RIPped image information in a first layer of a template file and storing the vector coordinates for each image patch in a second layer of the template file.

4. The method of claim 1, wherein step (d) comprises storing bitmap information corresponding to the RIPped image information in a first file and storing the vector coordinates for each image patch in a second file associated with the first file.

5. The method of any claim 1, further comprising using the vector coordinates for the one or more image patches to identify the non-image areas of the image file, and removing spurious data from the non-image areas prior to performing the raster image processing step (c).

6. The method of any claim 1, comprising determining positions for the one or more registration marks for each of the image patches in step (b), storing the register mark positions in association with the RIPped image information in step (d), and using the stored register mark position information for attaching the one or more register marks to each RIPped image patch in step (f).

7. The method of claim 1, comprising determining positions for the one or more registration marks for each of the image patches after the performance of step (e).

8. The method of claim 1, further comprising performing the method for each of a first image file and a second image file, creating one or more first image file image patches and one or more second image file image patches, wherein the step of creating the processing file comprises creating at least one processing file having at least one first image file image patch and at least one second image file image patch.

9. The method of claim 8, further comprising physically separating the at least one first image file plate patch and at least one second image file plate patch.

10. The method of claim 9, further comprising creating a first substrate comprising the at least one first image file plate patch and creating a second substrate comprising the at least one second image file plate patch.

11. The method of claim 10, further comprising printing first and second images respectively using the first and second printing substrates.

12. The method of claim 1, further comprising:
   h) creating a printing plate from the processing file, and i) physically separating the printing plate into one or more plate patches corresponding to the one or more RIPped image patches.

13. The method of claim 1, further comprising the step of:
j) affixing the one or more plate patches on a printing substrate using mounting device information and register marks in the processing file to coordinate placement of each plate patch on the substrate.

14. A computer program product comprising non-transitory machine readable instructions embodied in computer readable tangible medium for instructing a computer processor to perform the method steps of claim 1.

15. A system for creating a printing plate, the system comprising a computer memory, a computer processor coupled to the memory, an interface coupled to the processor to provide an image file in vector format comprising one or more image areas and one or more non-image areas; and a user interface coupled to the memory and the processor, wherein the processor is configured to:
receive, via the user interface, an identification of a boundary in vector-coordinates defining each image area, each image area and identified boundary corresponding to an image patch,
raster image process the image file into a pixel-based format to create RIPped image information;
associate the RIPped image information with the vector-coordinates corresponding to each image patch;
use the RIPped image information and associated vector coordinates corresponding to the image patches as an input to process the RIPped image information to automatically create one or more RIPped image patches;
attach one or more register marks to each RIPped image patch; and
save the one or more RIPped image patches with register marks and the corresponding vector coordinates in a processing file.

16. The system of claim 15, further comprising one or more processing units configured to create a printing plate from the processing file.

17. The system of claim 16, further comprising a cutting unit, wherein the processor is further configured to: provide instructions to the cutting unit for cutting the printing plate into one or more physical plate patches corresponding to the one or more image patches.

18. The system of claim 17, further comprising a mounting device, wherein processor is further configured to:
provide instructions for positioning a mounting device for affixing the one or more plate patches on a carrier substrate using mounting device information and register marks in the processing file and on each plate patch to coordinate placement of each plate patch on the substrate.

19. The system of claim 18, further comprising a printing unit configured to print an image using the carrier substrate having the plate patches affixed thereto.

20. A method of reducing plate material in plate making, comprising the steps of:
a) providing one or more original images, each original image including one or more full-format vector-based images;
b) identifying, using a user interface, at least two disjoint elements that contain image information, each disjoint element comprising a patch, each patch defined by boundary information in vector format;
c) creating a screened bitmap-format image of the original image;
d) storing the screened bitmap-format image in association with the patch boundary information in vector format corresponding to each patch;
e) automatically creating the one or more patches using the screened bitmap-format image and patch boundary information as an input; and
f) packing one or more patches to form a set of one or more packed images, each packed image including at least one patch and having an area, each packed image suitable to be sent to an imagesetter, a collective area of the packed images covering less plate area than a scanned full-format screened images.

21. A computer program product comprising non-transitory machine readable instructions embodied in computer readable tangible medium for instructing a computer to perform the method steps of claim 20.

22. A system comprising a computer memory, a computer processor coupled to the memory, an interface coupled to the processor to provide an image file in vector format comprising one or more image areas and one or more non-image areas, and a user interface coupled to the memory and the processor, wherein the processor is programed to perform the method steps of claim 20.

* * * * *